US008486263B2

(12) United States Patent
Argue et al.

(10) Patent No.: US 8,486,263 B2
(45) Date of Patent: Jul. 16, 2013

(54) FILTER WITH EXPANDABLE END CAP FACILITATING EASIER CHANGE-OUT

(75) Inventors: Daniel E. Argue, Rochester, MI (US); E. Michael Doyle, Okemos, MI (US); Edward M. Doyle, Bloomfield Hills, MI (US)

(73) Assignee: Hoff Engineering Company, Inc., Oxford, MI (US)

( * ) Notice: Subject to any disclaimer, the term of this patent is extended or adjusted under 35 U.S.C. 154(b) by 406 days.

(21) Appl. No.: 12/832,287

(22) Filed: Jul. 8, 2010

(65) Prior Publication Data

US 2012/0006734 A1    Jan. 12, 2012

(51) Int. Cl.
*B01D 27/00* (2006.01)
*B01D 27/08* (2006.01)
*B01D 35/30* (2006.01)
*B01D 29/25* (2006.01)

(52) U.S. Cl.
USPC .................. 210/232; 210/493.2; 210/497.01

(58) Field of Classification Search
USPC ................... 210/232, 497.01, 493.2
See application file for complete search history.

(56) References Cited

U.S. PATENT DOCUMENTS

| 5,250,179 | A |   | 10/1993 | Spearman |
| 5,399,264 | A | * | 3/1995  | Pulek et al. .................... 210/450 |
| 5,736,040 | A |   | 4/1998  | Duerrstein et al. |
| 5,916,435 | A |   | 6/1999  | Spearman et al. |
| 6,537,339 | B2 | * | 3/2003 | Schmitz et al. ................. 55/498 |
| 7,090,772 | B2 |   | 8/2006  | Pearson et al. |
| 7,469,906 | B2 |   | 12/2008 | Peet et al. |

* cited by examiner

*Primary Examiner* — Thomas M Lithgow
(74) *Attorney, Agent, or Firm* — Gifford, Krass, Sprinkle, Anderson & Citkowski, P.C.

(57) ABSTRACT

An improved filter arrangement solves problems associated with dislodging the filter from a support basket at change-out when intimate contact between the filter and basket is no longer desirable. An elastomeric end cap is bonded to the distal end of the filtering medium. The end cap has a circular, outer perimeter defining a diameter less than the inner diameter of the filter basket. The end cap is dome shaped, such that when the filtering element is inserted into the filter basket with the end cap positioned adjacent the bottom of the filter basket, the end cap assumes a pressurized state when a fluid entering the filtering element applies pressure to the end cap, causing the outer perimeter of the end cap to expand radially outwardly, and a non-pressurized state wherein the outer perimeter of the end cap contracts, facilitating an easier removal of the element from the basket.

11 Claims, 4 Drawing Sheets

FILTER WITH EXPANDABLE END CAP FACILITATING EASIER CHANGE-OUT

FIELD OF THE INVENTION

This invention relates generally to replaceable filters and, more particularly to a filter including an expandable and contractible elastomeric end cap that facilitates easier removal of the filter from a perforated filter basket.

BACKGROUND OF THE INVENTION

A known filter element includes a pleated filter media formed into a hollow cylinder. The longitudinal seam of the pleated cylinder is normally secured with adhesive or by a metal clip. In a common configuration, a plurality of longitudinally extending pleats project radially from a central axis.

Annular end caps are attached on both ends of the cylinder, encapsulating the pleats. One end cap has a central aperture providing fluid communication with the interior of the filter element and an inside-out flow pattern. The other end cap is closed and prevents access to the interior of the element. U.S. Pat. Nos. 5,250,179 and 7,090,772 disclose pleated bag filters of this general type.

The filter element is fitted inside a support basket of the same cylindrical shape. The support basket is manufactured of a material having a plurality of openings to permit flow. Common support basket materials are perforated hard plastic or steel, or wire mesh. The closed end cap fits inside the basket and typically faces the floor of the support basket. To encapsulate the outer tips of the pleated media, the closed end cap is larger in diameter than the pleated cylinder.

Held in place by the end cap, when pressurized, the media stretches outwardly toward the inner wall of the support basket. In operation, stress may accumulate in the filter media at the point where the pleats attach to the closed end cap, and tears can occur in the filter media proximate to this junction.

Support scrim or netting may be co-pleated on the outside of the filter media to retain the pleats. However, this raises manufacturing and selling costs. Unsupported filter media is much more economical. When pressurized, however, unsupported filter media tends to advance into and lodge in the openings of the support basket. A filter element that is dry and clean upon insertion is wet and dirty and in intimate contact with the support basket at change-out. The filter element often becomes stuck and difficult to extract.

Common solutions include various extraction tools. In practice, if the filter element can be slightly dislodged that is usually sufficient to offset the impinged media from the openings in the support basket allowing removal to proceed. But these extraction tools involve an additional operational step, and extra expense. Devices and provisions in the support basket itself to "pop-up" the filter element from the bottom are also seen. They, too, involve additional hardware and operational steps.

Another approach involves modifying the shape of the support basket and filter element from a true cylinder to a cone shape. U.S. Pat. No. 5,916,435 discloses cone-shaped support basket configured to receive a cone-shaped filter element. Although this approach reportedly facilitates ease of change-out, it limits filter element selection to those custom-coned for a particular basket shape. Yet another approach involves the introduction of a flexible support ring (U.S. Pat. No. 5,736,040) or internal spring (U.S. Pat. No. 7,469,906) into the end cap. Both of these techniques require additional components and manufacturing steps.

SUMMARY OF THE INVENTION

This invention overcomes the disadvantages of existing cylindrical filter designs, providing an easily removed element which is compatible with existing cylindrical filter baskets, including baskets of varying diameter. The invention allows unsupported pleated filter media to be used without expensive co-pleated support scrim, and obviates the necessity of an extraction tool.

In more specific terms, the invention resides in a replaceable filter element configured to be received by a cylindrical, perforated filter basket having an inner wall and a circular bottom with a diameter, D. The element includes a cylindrical filtering medium having proximal and distal end defining a length and a lengthwise hollow bore enabling a fluid to be filtered to enter into the hollow bore and pass through the medium from the inside out.

An elastomeric end cap is bonded to the distal end of the filtering medium. The end cap has a circular, outer perimeter defining a diameter D' less than D. At least a portion of the end cap is dome shaped, such that when the filtering element is inserted into the filter basket with the end cap positioned adjacent the bottom of the filter basket, the end cap assumes a pressurized state when a fluid entering the filtering element applies pressure to the end cap, causing the integral dome to flatten and the outer perimeter of the end cap to expand radially outwardly from D' to D, and a non-pressurized state wherein the outer perimeter of the end cap returns to D', thereby facilitating an easier removal of the element from the basket. In the pressurized state, at least a distal portion of the filtering medium also expands radially outwardly toward and against the inner wall of the filter basket.

One embodiment of the invention is configured for filter baskets with flat bottoms. The end cap includes a convex surface oriented toward the proximal end of the filtering element and a concave surface oriented toward the distal end of the filtering medium such that, in the pressurized state, the concave surface of the end cap flattens out against the bottom of the filter basket. An alternative embodiment of the invention is configured for filter baskets with concave bottoms. The end cap includes a convex surface oriented toward the distal end of the filtering such that, in the pressurized state, the convex surface of the end cap conforms against the concave surface of the filter basket.

In any embodiment, the filter medium may be pleated or non-pleated, as would be the case with certain filter tube designs. The elastomeric end cap may be composed of polyurethane or any other suitable elastomeric material. The dome shape may be formed in a central area of the end cap surrounded by a flat, annular ring to which the distal end of the filtering medium is attached.

BRIEF DESCRIPTION OF THE DRAWINGS

This invention will be described in further detail with reference to illustrative preferred embodiments shown in the accompanying drawing figures in which.

DETAILED DESCRIPTION OF THE PREFERRED EMBODIMENTS

This invention resides in an improved filter arrangement, solving problems associated with dislodging the filter from the support basket at change-out when intimate contact between the filter and basket is no longer desirable. The preferred embodiments solve this problem through the provision of a filter element having a closed end cap design incorporating an integral, expandable cup. When pressurized, the elastomeric cup flattens to the bottom of the basket, causing the outer diameter of the end cap to expand outwardly to the inner wall of the basket.

The expansion of the end cap diameter also causes the pleated media, previously encapsulated thereinto, to be brought outwardly and supported against the support basket's interior cylindrical surface. When the pressure is turned off, the elastomeric end cap contracts to its original configuration, bringing the media away from intimate contact with the basket wall. This process can be repeated during operational cycling until the filter has blinded off and is ready for change-out. Since the outer diameter of the end cap and distal filter media return to their original dimensions, the filter element backs away from interior of the support basket, thereby dislodging the media from the openings in the support basket, easing change-out.

The end cap is composed of an elastomeric material of a predetermined thickness, diameter, tensile, and flex strength. An example of the assembly process utilized to manufacture a 7" diameter end cap proceeds as follows. A two-part liquid polyurethane, of the hardener/resin type commonly employed for liquid filter end cap manufacture, having a high tensile strength rating and shore A durometer rating of approximately 70, is mixed and allowed to partially cure on a warm table set at 120° F. When the polyurethane is 50-70 percent cured, it is poured into an approximately 7" diameter mold to a depth of 3/16." Integral to the mold and protruding from it is a 3" diameter, centered, convex bowl, approximately 5/8" tall. The fast-hardening polyurethane sets up and forms a 1.5 radius concave cup shape over the bowl. The end cap is allowed to form and harden on the warm table in this shape before extraction from the mold. Note that while polyurethane is used in the preferred embodiments, other known materials may be used including other urethanes, silicones or flurocarbon compounds.

The preferred embodiment further utilizes a concentrically arranged, accordion-folded filter media bonded to the end cap. The invention is applicable to non-pleated filter elements such as filter tubes, for example. Although one disclosed embodiment includes an integral cup or bowl which flattens in conformity with the floor of a flat bottomed support basket, in alternative embodiments the filter's end cap is molded in a convex shape to engage the form of a convex-shaped support basket bottom. Both types are detailed in the following description.

Figure 1:
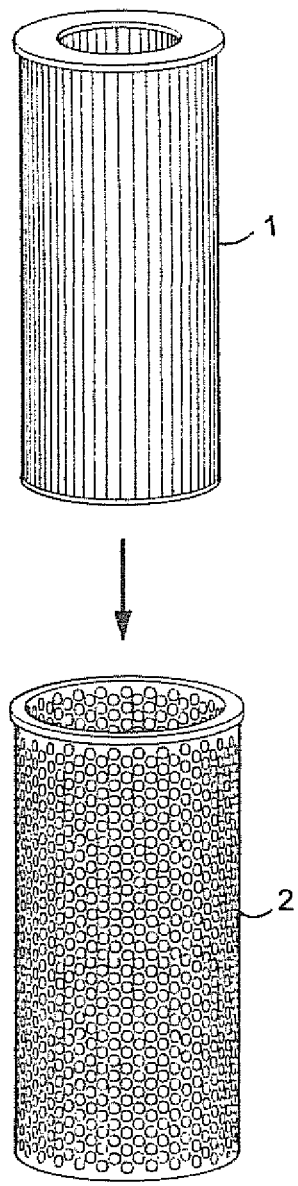
FIG. 1 shows a perspective view of a cylindrical filter element of the pleated bag filter type and a perforated support basket into which it is inserted.
Figure 2:
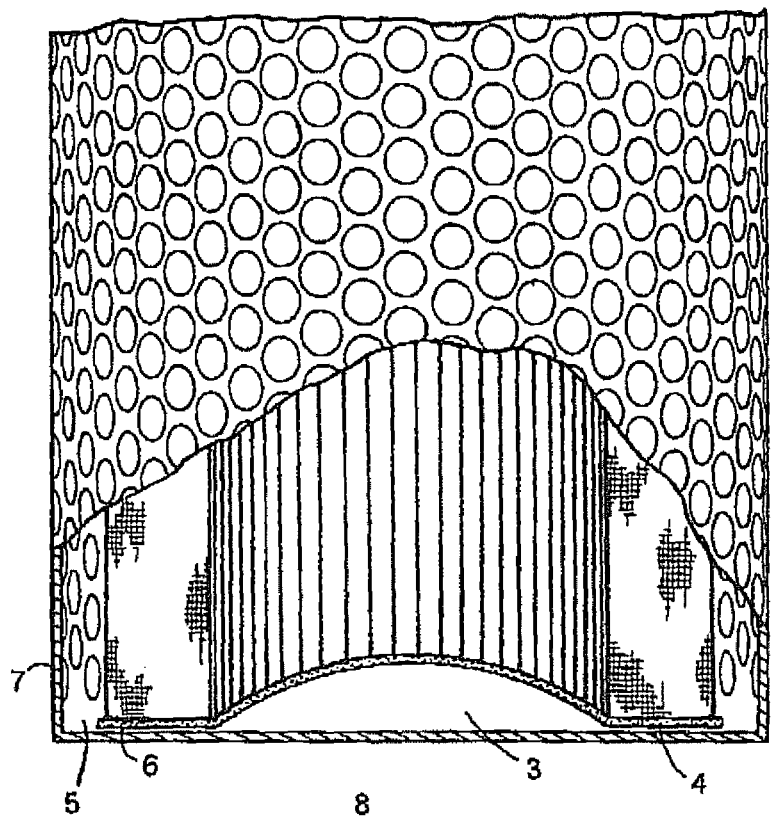
FIG. 2 is a close-up, cut-a-way view of a filter element's elastomeric closed end cap with a cup or bowl shape integrally molded in its middle and seated at the bottom of a perforated support basket. The end cap is in its cupped, concave shape before pressurization.

Turing now to the drawings, FIG. 1 shows a cylindrically shaped pleated bag filter element, reference number 1, and a cylindrical support basket 2 into which it fits. FIG. 2 illustrates the bowl or cup shape 3 of the filter's elastomeric end cap 4 before pressurization. In this pre-operational state, there is a space 5 between the exterior side 6 of the pleated filter element and interior wall 7 of the perforated support basket.

Figure 3:
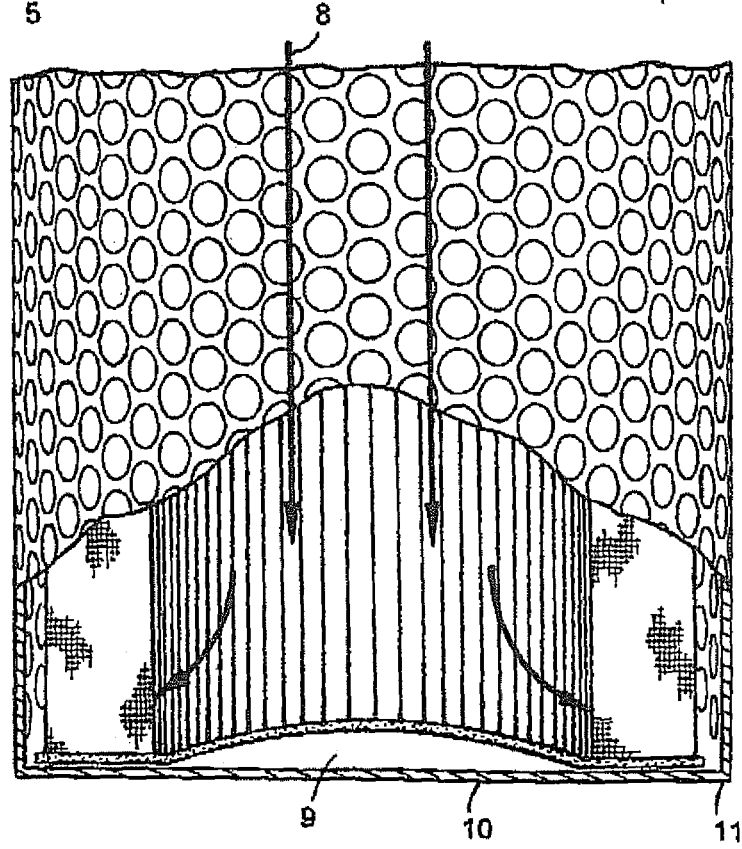
FIG. 3 illustrates arrows, signifying pressure, beginning to flatten the cup in the end cap downwards towards the support basket's floor and outwards to the support basket's interior wall.

In FIG. 3, pressure 8 is applied to the inside of the filter. This causes the bowl shape of the elastomeric end cap to flatten 9 towards the support basket's floor 10 and then to spread outward towards the support basket's cylindrical interior 11.

Figure 4:
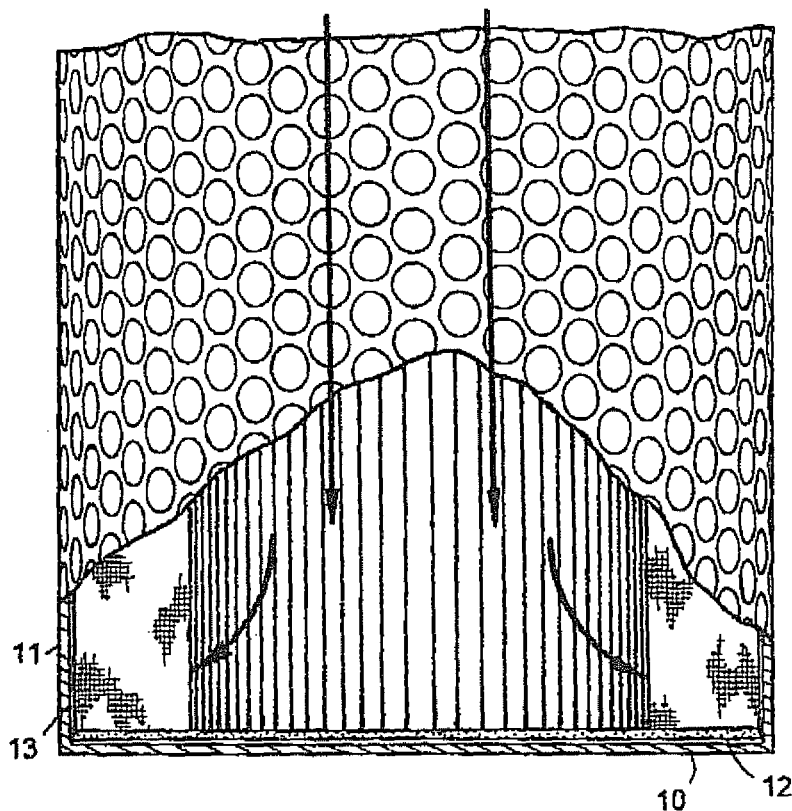
FIG. 4 shows the bottom of filter element's end cap, having been pressurized, expanded down and out to achieve contact with the support basket's floor and interior wall.

In FIG. 4, with pressure having been applied, the bottom of the elastomeric end cap 12 is now in contact with the support basket's floor 10. The exterior side of the pleated bag filter 13 has been pushed outward to the interior wall of the support basket 11 and is now supported by it.

Figure 5:
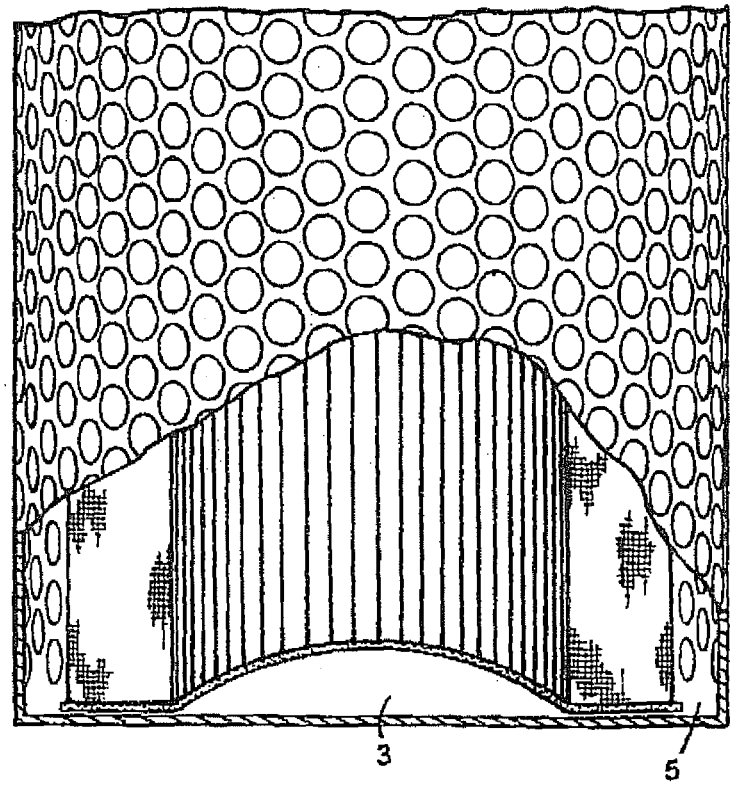
FIG. 5 shows the cup in the filter element's end cap, pressure having been turned off, returned to its original configuration. The outer diameter of the end cap has also returned to its original dimension.

In FIG. 5 pressure has ceased, and the pleated bag filter's elastomeric end cap has returned to its original dimensions. The bowl or cup shape has resumed its original configuration 3. There is again a space 5 between the exterior of the pleated bag filter and the interior of the perforated support basket, facilitating a more straightforward change-out.

Figure 6:
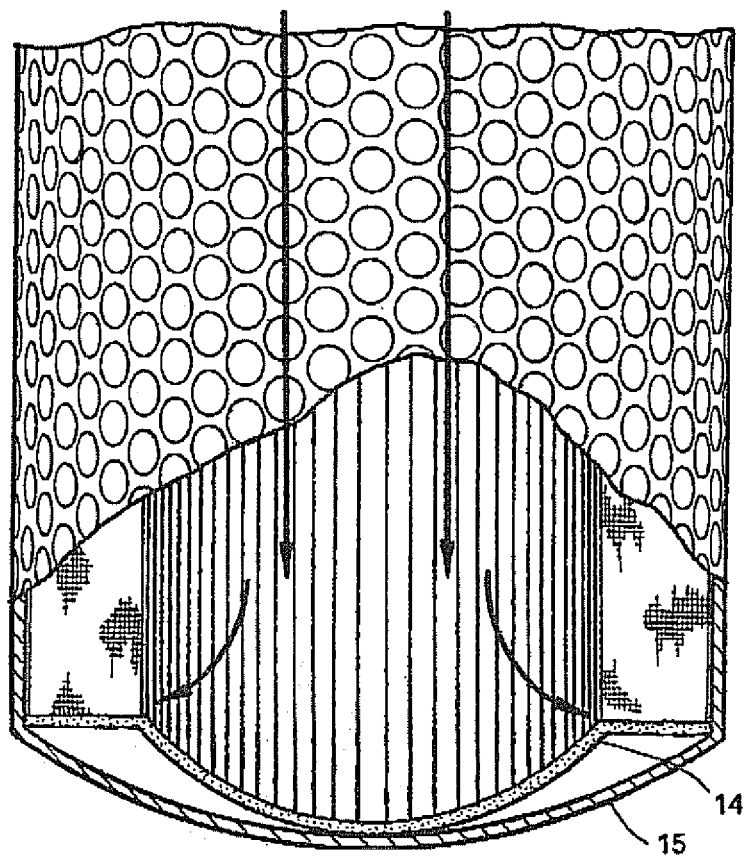
FIG. 6 shows another embodiment, in a pressurized state, wherein the filter element's end cap is formed in a convex shape to engage the concave shape of a support basket bottom. The arrows, signifying pressure, expand the end cap down and out to achieve contact with the support basket's floor and interior wall.

FIG. 6 depicts an alternative embodiment of the invention applicable to situations wherein the cup or bowl is pre-molded with a convex surface 14 to engage a matched concave shape 15 in the support basket's bottom. Operation is substantially the same as the described with respect to FIGS. 1-5.

Having described our invention, we claim:

1. A replaceable filter element configured to be received by a cylindrical, perforated filter basket having an inner wall and a circular bottom with a diameter, D, the filter element comprising:

a cylindrical filtering medium having proximal and distal ends defining a length and a lengthwise hollow bore enabling a fluid to be filtered to enter into the hollow bore and pass through the medium from the inside out;

an elastomeric end cap bonded to the distal end of the filtering medium, the end cap having a central area that closes off the distal end of the lengthwise hollow bore and a circular, outer perimeter defining a diameter D' less than D; and the central area of the end cap further being dome shaped, thereby presenting a convex surface to the hollow bore, such that when the filtering element is inserted into the filter basket with the end cap positioned adjacent the bottom of the filter basket, the end cap assumes a pressurized state when a fluid entering the filtering element applies pressure to the central area of the end cap, causing the dome shape to flatten out and the outer perimeter of the end cap to expand radially outwardly from D' to D, and a non-pressurized state wherein the dome shape is re-established and outer perimeter of the end cap returns to D', facilitating an easier removal of the element from the basket.

2. The replaceable filter element of claim 1, wherein the filter medium is pleated.

3. The replaceable filter element of claim 1, wherein the filter medium is a non-pleated tube.

4. The replaceable filter element of claim 1, wherein the dome shape in the central area of the end cap is surrounded by a flat, annular ring to which the distal end of the filtering medium is attached.

5. The replaceable filter element of claim 1 wherein, in the pressurized state, at least a distal portion of the filtering medium also expands radially outwardly toward and against the inner wall of the filter basket and wherein, in the non-pressurized state at least a distal portion of the filtering medium also contracts radially inwardly away from the inner wall of the filter basket.

6. The replaceable filter element of claim 1, wherein:
the bottom of the filter basket is substantially flat;
the end cap includes a convex surface oriented toward the proximal end of the filtering element and a concave surface oriented toward the distal end of the filtering medium; and
in the pressurized state, the concave surface of the end cap flattens out against the bottom of the filter basket.

7. A replaceable filter element configured to be received by a cylindrical, perforated filter basket having an inner wall and a circular, concave bottom surface with a diameter, D, the filter element comprising:
a cylindrical filtering medium having proximal and distal ends defining a length and a lengthwise hollow bore enabling a fluid to be filtered to enter into the hollow bore and pass through the medium from the inside out;
an elastomeric end cap bonded to the distal end of the filtering medium, the end cap having a central area that closes off the distal end of the lengthwise hollow bore and a circular, outer perimeter defining a diameter D' less than D; and
the central area of the end cap further being dome shaped, thereby presenting a convex outer surface to the concave bottom surface of the filter basket, such that when the filtering element is inserted into the filter basket with the end cap positioned adjacent the bottom of the filter basket, the end cap assumes a pressurized state when a fluid entering the filtering element applies pressure to the central area of the end cap, causing the convex surface of the end cap to conform against the concave surface of the filter basket and the outer perimeter of the end cap to expand radially outwardly from D' to D, and a non-pressurized state wherein the dome shape is re-established and outer perimeter of the end cap returns to D', facilitating an easier removal of the element from the basket.

8. The replaceable filter element of claim 7, wherein the filter medium is pleated.

9. The replaceable filter element of claim 7, wherein the filter medium is a non-pleated tube.

10. The replaceable filter element of claim 7, wherein the dome shape in the central area of the end cap is surrounded by a flat, annular ring to which the distal end of the filtering medium is attached.

11. The replaceable filter element of claim 7 wherein, in the pressurized state, at least a distal portion of the filtering medium also expands radially outwardly toward and against the inner wall of the filter basket and wherein, in the non-pressurized state at least a distal portion of the filtering medium also contracts radially inwardly away from the inner wall of the filter basket.

* * * * *